(12) United States Patent
Kim et al.

(10) Patent No.: US 8,994,558 B2
(45) Date of Patent: Mar. 31, 2015

(54) AUTOMOTIVE AUGMENTED REALITY HEAD-UP DISPLAY APPARATUS AND METHOD

(71) Applicant: Electronics and Telecommunications Research Institute, Daejeon (KR)

(72) Inventors: Kyong-Ho Kim, Daejeon (KR); Hye-Sun Park, Daejeon (KR); Dae-Sub Yoon, Daejeon (KR); Jong-Woo Choi, Daejeon (KR); Yoon-Sook Hwang, Gyeongbuk (KR); Jong-Hyun Park, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 169 days.

(21) Appl. No.: 13/753,590

(22) Filed: Jan. 30, 2013

(65) Prior Publication Data

US 2013/0194110 A1 Aug. 1, 2013

(30) Foreign Application Priority Data

Feb. 1, 2012 (KR) .......................... 10-2012-0010238
Sep. 13, 2012 (KR) .......................... 10-2012-0101339

(51) Int. Cl.
*G08G 1/09* (2006.01)
*G08G 1/0967* (2006.01)
(Continued)

(52) U.S. Cl.
CPC .............. *G08G 1/0967* (2013.01); *G02B 27/01* (2013.01); *G08G 1/166* (2013.01); *G08G 1/167* (2013.01);
(Continued)

(58) Field of Classification Search
CPC ............. G02B 27/10; G02B 2027/014; G02B 2027/0181; G02B 2027/0187; G02B 2027/0138; G08G 1/16; G08G 1/166; G08G 1/167; G08G 1/0967; G06K 9/00671; G06K 9/00248; B60Q 9/008; B60R 2300/205
USPC ................. 340/435, 436, 438, 461, 916, 905, 340/425.5; 701/1, 301; 345/7–9, 156; 382/104
See application file for complete search history.

(56) References Cited

U.S. PATENT DOCUMENTS 7,167,779 B2 * 1/2007 Kashiwada et al. .............. 701/1
2007/0124071 A1 * 5/2007 Joo et al. ....................... 701/211
(Continued)

FOREIGN PATENT DOCUMENTS

| JP | 09-066757 A | 3/1997 |
|---|---|---|
| JP | 2006-284458 A | 10/2006 |
| JP | 2009-190646 A | 8/2009 |
| KR | 10-1998-0014601 A | 5/1998 |

(Continued)

*Primary Examiner* — Anh V La
(74) *Attorney, Agent, or Firm* — Rabin & Berdo, P.C.

(57) ABSTRACT

Disclosed herein is an automotive augmented reality HUD apparatus and method, which can adaptively change a location and a direction based on the visual field of a driver, thus reducing errors in location matching between virtual object information and real-world information. The automotive augmented reality HUD apparatus includes a viewing angle calculation unit for estimating a line-of-sight direction of a driver using a face direction, detected based on face images of the driver, and center positions of pupils and calculating a viewing angle. A matching unit matches a location of real-world information located in front of a driver's seat with a location of corresponding virtual object information located in front of the driver's seat, based on the line-of-sight direction and the viewing angle. A display unit displays results of the matching by the matching unit, wherein the display unit enables rotation thereof and location change thereof.

18 Claims, 9 Drawing Sheets

(51) Int. Cl.
  *G02B 27/01* (2006.01)
  *G08G 1/16* (2006.01)
  *G06K 9/00* (2006.01)

(52) U.S. Cl.
  CPC .... *G06K 9/00845* (2013.01); *G02B 2027/0187* (2013.01); *G06K 9/00248* (2013.01); *G06K 9/00671* (2013.01)

USPC ............................... 340/905; 340/438; 345/7

(56) References Cited

U.S. PATENT DOCUMENTS

2010/0253542 A1* 10/2010 Seder et al. ................ 340/932.2
2011/0260886 A1* 10/2011 Nagura et al. ................ 340/905

FOREIGN PATENT DOCUMENTS

KR  10-2009-0076242 A  7/2009
KR  10-2010-0026466 A  3/2010

* cited by examiner

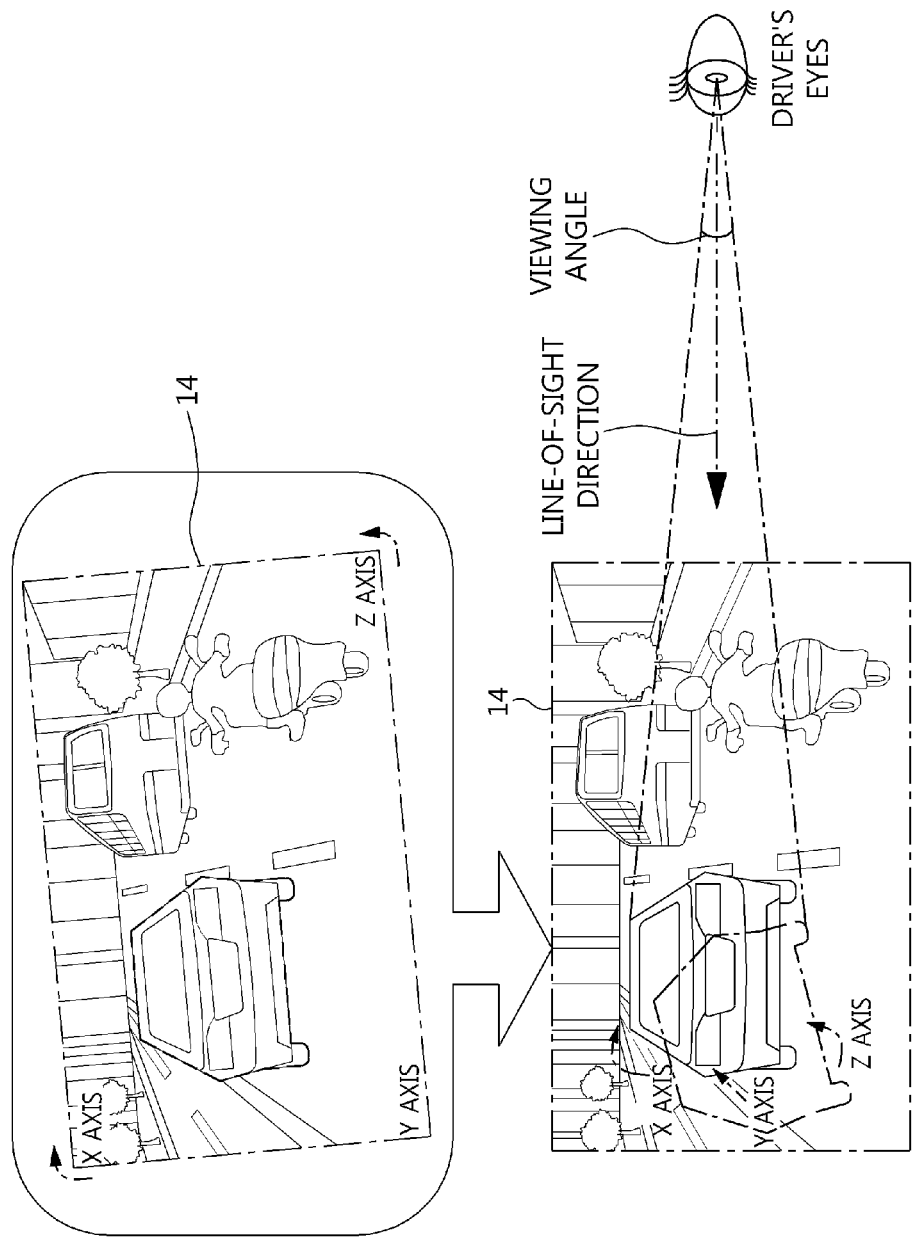

AUTOMOTIVE AUGMENTED REALITY HEAD-UP DISPLAY APPARATUS AND METHOD

CROSS REFERENCE TO RELATED APPLICATIONS

This application claims the benefit of Korean Patent Application Nos. 10-2012-0010238, filed on Feb. 1, 2012 and 10-2012-0101339 filed on Sep. 13, 2012, which are hereby incorporated by reference in their entirety into this application.

BACKGROUND OF THE INVENTION

1. Technical Field

The present invention relates generally to an automotive augmented reality head-up display apparatus and method and, more particularly, to an automotive augmented reality head-up display apparatus and method, which provide various types of convenience information, safe driving information, etc. to a driver seated in a vehicle as augmented reality so that the locations of the convenience information and the safe driving information match the locations of real-world information actually viewed by the driver, in various driving environments, such as day and night driving and driving in fog or heavy rain.

2. Description of the Related Art

Vehicle information provision devices that were developed in the past are classified into three types.

First, there is a 'vehicle terminal' which is mounted at the center of a lower right portion of a driver's seat and provides various types of information to the driver. Such a vehicle terminal is characterized in that, if information is provided by the vehicle terminal while the driver is driving a vehicle while looking forward, the driver is forced to turn his or her head or eyes in a direction in which the terminal is located so as to view the provided information. In this case, there is a risk of an accident occurring because the attention of the driver is diverted.

Second, there is a 'Head-Up Display (HUD) apparatus' mainly installed in a luxury vehicle. Such an HUD apparatus displays simple vehicle information, such as information about arrows guiding the driver along a changed route and text information indicative of speed, over a dashboard. Therefore, since the driver can view the information provided in front of the driver while looking forward without having to turn his or her eyes or head to view the provided information, the risk of an accident occurring due to the diversion of attention can be reduced. However, since the locations of the provided information are shown to the driver in a state in which the locations do not match the locations of forward real-world information (for example, roads, buildings, vehicles, traffic signs, etc.), a load occurs when the driver recognizes the provided information, thus deteriorating driving safety and convenience. Further, when location matching (alignment) with the real world is not possible, it is difficult to provide various types of information (for example, a lane, an obstruction such as a pedestrian or a forward vehicle, etc.) via the HUD.

Third, there is an 'augmented reality HUD apparatus' which has been investigated and developed so as to graft such an HUD apparatus onto a vehicle. This augmented reality HUD apparatus matches the locations of real-world information located in front of the driver with the locations of information displayed on the HUD based on the visual field of the driver, and provides safe driving information to the driver.

Such an augmented reality HUD apparatus provides safe driving information in conformity with the locations of real-word information (objects), thus allowing the driver to more easily recognize the provided information. However, it is difficult to exactly match the locations of the augmented reality information with the locations of the real-world information and then provide the augmented reality information. The reason for this is that, for such matching, the position and posture of the vehicle must be precisely detected and recognized, and the position and posture of the head and eyes of the driver must also be precisely detected and recognized However, due to technical limitations, errors may occur in the precision of position and posture, and such an error may deteriorate accuracy in location matching between the real-world information and safe driving information.

An embodiment of such an augmented reality HUD apparatus is disclosed in Korean Patent Application Publication No. 10-2009-0076242 (entitled "Automotive HUD apparatus and method of controlling the operation of the same"). The automotive HUD apparatus presented in Korean Patent Application Publication No. 10-2009-0076242 vertically and laterally adjusts the location of an HUD unit in accordance with the motion of the eyeballs of a driver, thus adjusting an angle of projection of image information on the HUD unit. However, the automotive HUD apparatus presented in Korean Patent Application Publication No. 10-2009-0076242 is disadvantageous in that only the location at which virtual safe driving information is displayed can be changed by adjusting the angle of projection on the HUD unit in accordance with the motion of the eyeballs of the driver, and a direction or an angle cannot be changed.

SUMMARY OF THE INVENTION

Accordingly, the present invention has been made keeping in mind the above problems occurring in the prior art, and an object of the present invention is to provide an automotive augmented reality HUD apparatus and method, which can adaptively change a location and a direction based on the visual field of a driver, thus reducing errors in location matching between virtual object information and real-world information.

In accordance with an aspect of the present invention to accomplish the above object, there is provided an automotive augmented reality Head-Up Display (HUD) apparatus, including a viewing angle calculation unit for estimating a line-of-sight direction of a driver using a face direction, detected based on face images of the driver, and center positions of pupils of the driver and calculating a viewing angle; a matching unit for matching a location of real-world information located in front of a driver's seat with a location of corresponding virtual object information located in front of the driver's seat, based on the line-of-sight direction and the viewing angle output from the viewing angle calculation unit; and a display unit for displaying results of the matching by the matching unit, wherein the display unit is configured to enable rotation thereof and location change thereof.

Preferably, the rotation of the display unit may include movements in directions of pitch, roll, and yaw.

Preferably, the location change of the display unit may include leftward, rightward, upward, downward, forward, and backward movements.

Preferably, the display unit may be rotated or the location thereof is changed by a manual manipulation of the driver.

Preferably, the display unit may be rotated or the location thereof is changed via automatic adjustment Preferably, the automotive augmented reality HUD apparatus may further include a matching error calculation unit for calculating a matching error occurring in the matching unit; and an adjustment unit for rotating the display unit or changing the location of the display unit based on the matching error calculated by the matching error calculation unit, wherein the matching unit may re-match a location of the real-world information with a location of the virtual object information through the adjustment by the adjustment unit Preferably, the adjustment unit may rotate the display unit or change the location of the display unit until the calculated matching error falls within an error range.

Preferably, the display unit may be operated at an initial location in a scroll type or a fold type to enter a displayable state.

Preferably, the display unit may be manually scrolled up or down from the initial location or be manually unfolded from a folded state using a manual operation of the driver.

Preferably, the display unit may be automatically scrolled up or down from the initial location or be automatically unfolded from a folded state in compliance with the driver's instruction.

Preferably, the virtual object information may include one or more of a stationary object located in front of the driver's seat based on map information and a moving object located in front of the driver's seat based on recognition of images.

In accordance with another aspect of the present invention to accomplish the above object, there is provided an automotive augmented reality Head-UP Display (HUD) method, including estimating, by a viewing angle calculation unit, a line-of-sight direction of a driver using a face direction, detected based on face images of the driver, and center positions of pupils of the driver and calculating a viewing angle; matching, by a matching unit, a location of real-world information located in front of a driver's seat with a location of corresponding virtual object information located in front of the driver's seat, based on the line-of-sight direction and the viewing angle output at estimating the line-of-sight direction and at calculating the viewing angle; displaying, by a display unit, results of the matching; and performing, by an adjustment unit, one or more of rotation and location change on the display unit depending on the results of the matching.

Preferably, the rotation at performing one or more of the rotation and the location change may include movements in directions of pitch, roll, and yaw.

Preferably, the location change at performing one or more of the rotation and the location change may include leftward, rightward, upward, downward, forward, and backward movements.

Preferably, the performing one or more of the rotation and the location change may further include calculating a matching error occurring at matching; and rotating the display unit or changing the location of the display unit based on the calculated matching error, wherein matching is configured to re-match the location of the real-world information with the location of the virtual object information based on adjustment at performing one or more of the rotation and the location change.

Preferably, performing one or more of the rotation and the location change may be configured to rotate the display unit or change the location of the display unit until the calculated matching error falls within an error range.

Preferably, displaying may be performed after the display unit has been operated at an initial location in a scroll type or a fold type to enter a displayable state.

Preferably, the display unit may be manually scrolled up or down from the initial location or be manually unfolded from a folded state using a manual operation of the driver.

Preferably, the display unit may be automatically scrolled up or down from the initial location or be automatically unfolded from a folded state in compliance with the driver's instruction.

Preferably, the virtual object information may include one or more of a stationary object located in front of the driver's seat based on map information and a moving object located in front of the driver's seat based on recognition of images.

BRIEF DESCRIPTION OF THE DRAWINGS

The above and other objects, features and advantages of the present invention will be more clearly understood from the following detailed description taken in conjunction with the accompanying drawings, in which:

FIGS. 7 to 9 are diagrams used to describe the automotive augmented reality HUD method according to an embodiment of the present invention.

DESCRIPTION OF THE PREFERRED EMBODIMENTS

Figure 1:
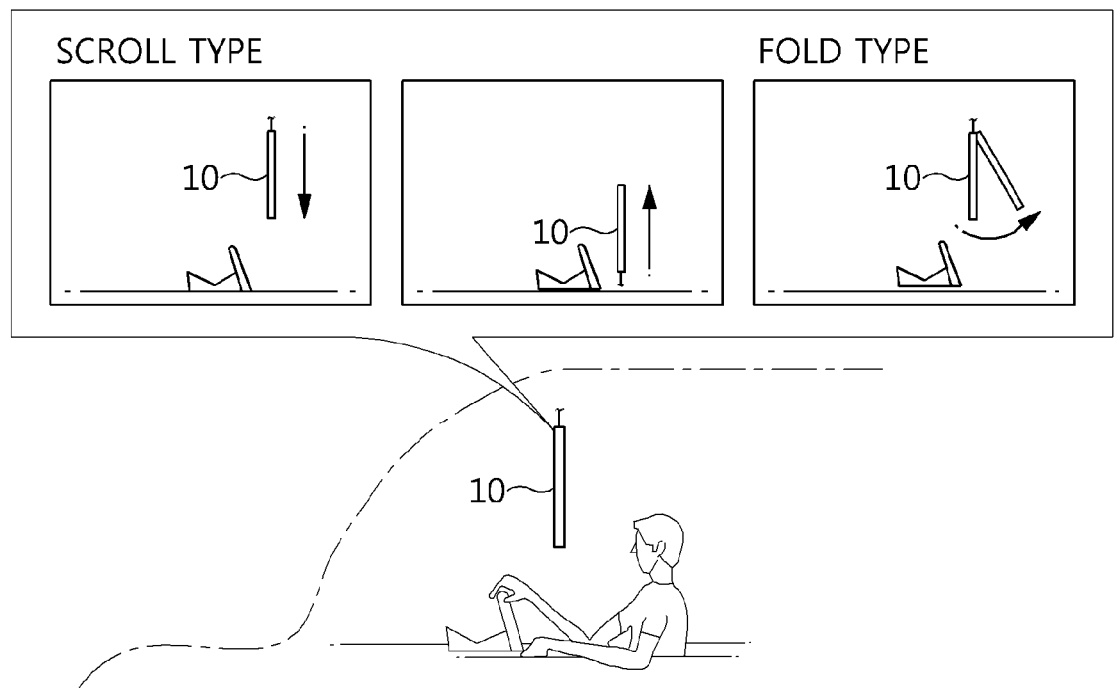
FIG. 1 is a diagram showing an example in which a display unit employed in an automotive augmented reality HUD apparatus according to an embodiment of the present invention is used.

In order to solve the problems of the conventional augmented reality Head-Up Display (HUD) apparatus, a method of reducing errors in location matching (alignment) between real-world information and safe driving information is required. One of the causes of errors is that the display panel of the augmented reality HUD apparatus is a fixed type. Such a fixed-type augmented reality HUD apparatus causes an error during the procedure of matching the locations of real-world information with the locations of safe driving information provided by the HUD due to the above-described problems.

Therefore, if a driver adjusts the direction or location of the HUD in accordance with his or her posture or position, the driver can be provided with the safe driving information such that real-word information more precisely matches the safe driving information in conformity with the driver's visual field.

As a result, the present invention adaptively changes the angle or location of the display in conformity with the driver's visual field, thus reducing an error in location matching with real-world information and providing information that more desirably conforms to the driver's visual field.

Hereinafter, embodiments of an automotive augmented reality HUD apparatus and method according to the present invention will be described in detail with reference to the attached drawings The terms and words used in the present specification and the accompanying claims should not be limitedly interpreted as having their common meanings or those found in dictionaries. Therefore, the embodiments described in the present specification and constructions shown in the drawings are only the most preferable embodiments of the present invention, and are not representative of the entire technical spirit of the present invention. Accordingly, it should be understood that various equivalents and modifications capable of replacing the embodiments and constructions of the present invention might be present at the time at which the present invention was filed.

FIG. 1 is a diagram showing an example in which a display unit employed in the automotive augmented reality HUD apparatus according to an embodiment of the present invention is used.

When convenience information (driving route information, Point of Interest (POI) information, guideboard information, etc.) and safe driving information (lane information, vehicle information, pedestrian information, etc.) provided by the automotive augmented reality head-up display (HUD) apparatus according to an embodiment of the present invention are desired to be received, a display unit 10 at an initial location is operated in a scroll type or a fold type and is then moved to a displayable location.

In FIG. 1, the scroll type refers to a type in which the display unit is scrolled down from above, or scrolled up from below, and the fold type typically refers to a type in which the display unit, mounted over a driver's seat and formed in the shape of a sun visor, is unfolded from a folded state.

An operation in the scroll type or fold type is performed automatically or manually. The automatic operation is to move the display unit 10 to the displayable location using an internally provided motor (not shown) or the like. The manual operation requires a driver to scroll the display unit 10 up or down or unfold the folded display unit with his or her hand while the driver personally holds the display unit 10.

Figure 2:
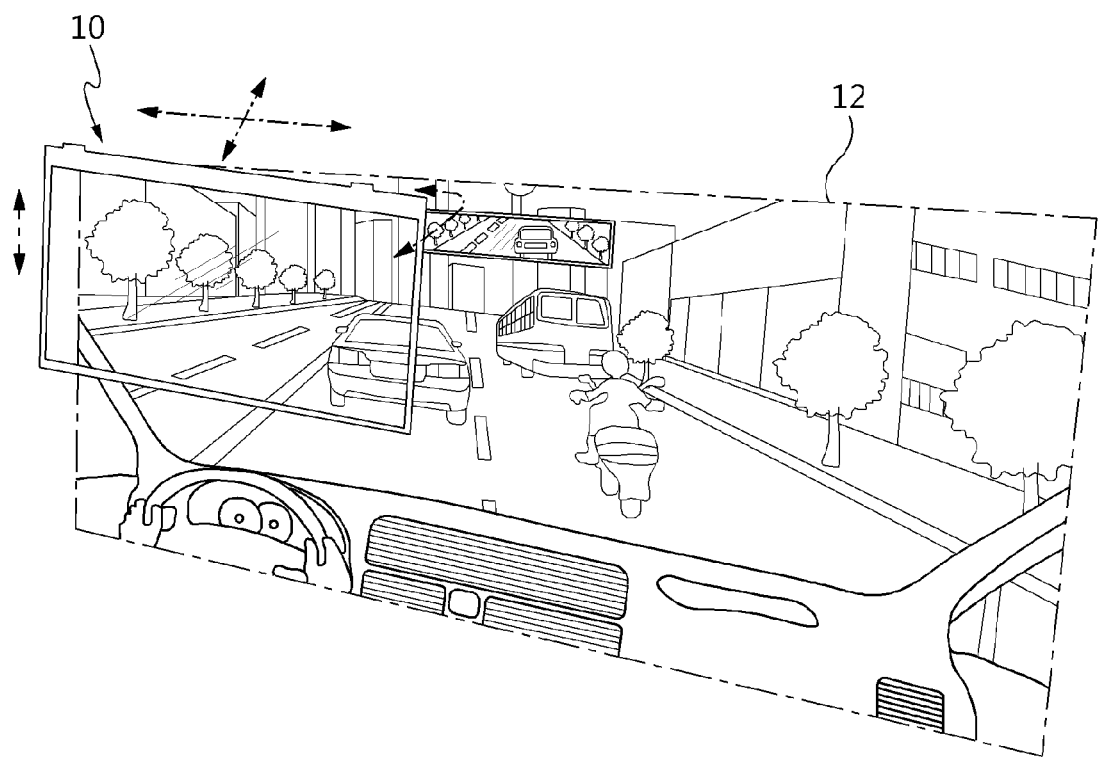
FIG. 2 is a diagram showing an example in which the display unit employed in the automotive augmented reality HUD apparatus according to an embodiment of the present invention is mounted.
Figure 3:
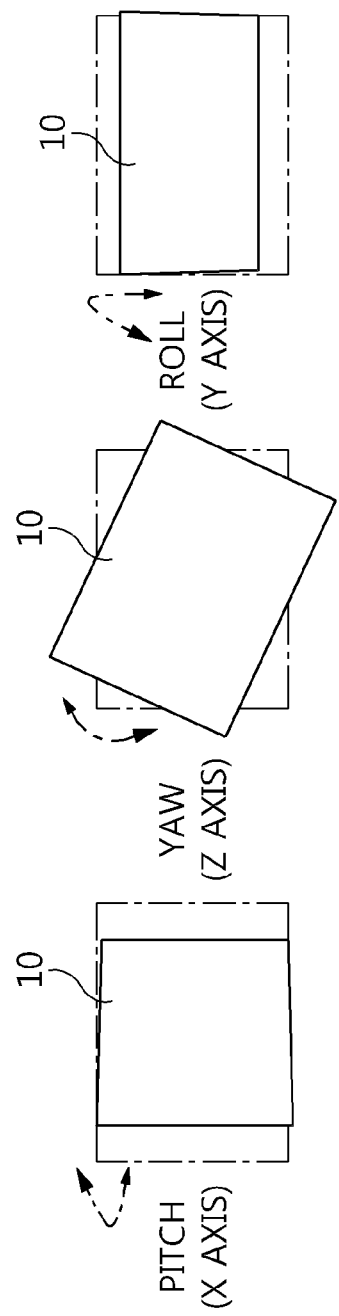
FIG. 3 is a diagram showing an example in which the direction of the display unit employed in the automotive augmented reality HUD apparatus according to an embodiment of the present invention is adjusted.
Figure 4:
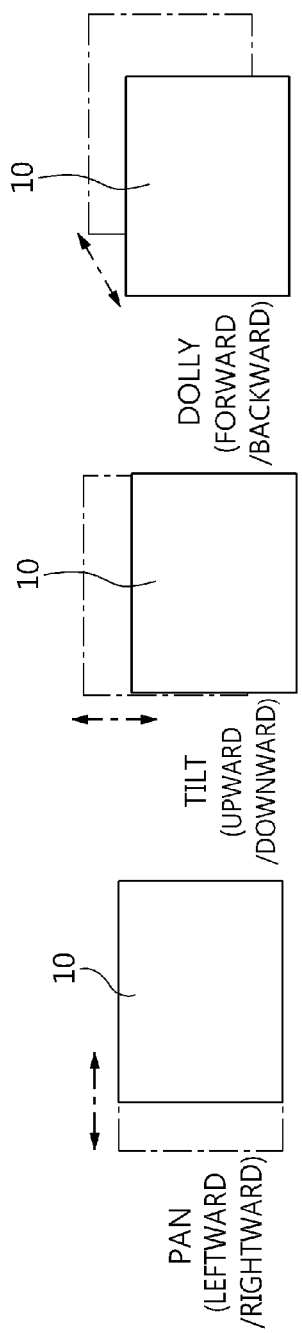
FIG. 4 is a diagram showing an example in which the location of the display unit employed in the automotive augmented reality HUD apparatus according to an embodiment of the present invention is adjusted.

FIG. 2 is a diagram showing an example in which the display unit employed in the automotive augmented reality HUD apparatus according to an embodiment of the present invention is mounted, FIG. 3 is a diagram showing an example in which the direction of the display unit employed in the automotive augmented reality HUD apparatus according to an embodiment of the present invention is adjusted, and FIG. 4 is a diagram showing an example in which the location of the display unit employed in the automotive augmented reality HUD apparatus according to an embodiment of the present invention is adjusted.

A display unit 10 employed in the automotive augmented reality HUD apparatus according to an embodiment of the present invention may be installed on a dashboard or a windshield in front of a driver's seat The display unit 10 is preferably made of a transparent material. In FIG. 2, it is assumed that the display unit 10 is mounted near a sun visor or on a windshield 12, in front of the driver's seat The display unit 10 enables both its rotation and its location change. Referring to FIG. 3, the display unit 10 can be rotated in the direction of pitch (an x axis), roll (a y axis), and yaw (a z axis). Referring to FIG. 4, the location of the display unit 10 can be moved leftward, rightward, upward, downward, forward, and backward. Here, the leftward or rightward movement of location is called a pan movement, the upward or downward movement of location is called a tilt movement, and the forward or backward movement of location is called a dolly movement In this way, the display unit 10 enables the location thereof to be changed in upward, downward, leftward, rightward, forward and backward directions and/or the rotation thereof to be adjusted in the direction of x, y, and z axes, in conformity with the driver's line of sight. The location and direction of the display unit 10 are adjusted in conformity with the driver's visual field, thus enabling the locations of virtual object information to precisely match the locations of real-world information. Accordingly, more accurate augmented reality information can be provided, thus allowing the driver to be more accurately and easily provided with safe driving information or the like.

Figure 5:
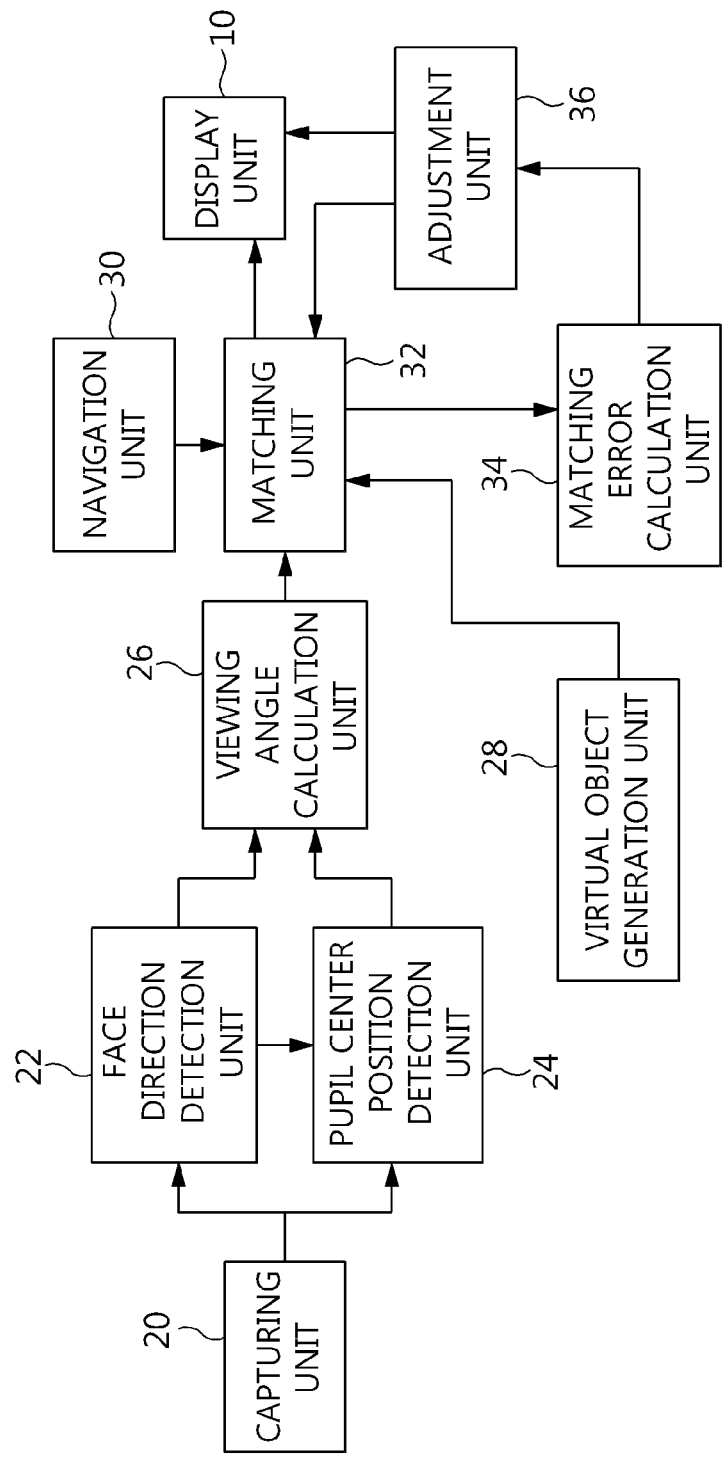
FIG. 5 is a block diagram showing an automotive augmented reality HUD apparatus according to an embodiment of the present invention.

As described above, the location and direction of the display unit 10 can be manually adjusted by the driver or can be automatically adjusted in conformity with the driver's line of sight FIG. 5 is a block diagram showing an automotive augmented reality HUD apparatus according to an embodiment of the present invention.

An automotive augmented reality HUD apparatus according to an embodiment of the present invention includes a display unit 10, a capturing unit 20, a face direction detection unit 22, a pupil center position detection unit 24, a viewing angle calculation unit 26, a virtual object generation unit 28, a navigation unit 30, a matching unit 32, a matching error calculation unit 34, and an adjustment unit 36.

The capturing unit 20 is installed on a dashboard in front of the driver's seat to face the driver. The capturing unit 20 includes at least one camera. The capturing unit 20 captures face images of the driver, and outputs a plurality of captured face images. For example, the capturing unit 20 captures a front face image of the driver and then captures upper, lower, left and right face images and images corresponding to angles of a plurality of line-of-sight directions in consideration of the direction of the face and the line-of-sight direction that can be moved and changed so as to look at the outside of the vehicle on the windshield during the driving of the vehicle. In this case, the upper, lower, left and right direction values of the face and various angle values of the line-of-sight directions are implemented using experimental threshold values obtained by conducting driving experiments on various test subjects.

The face direction detection unit 22 detects the face direction of the corresponding driver from the plurality of face images captured by the capturing unit 20. For example, the face direction detection unit 22 sets feature points of a facial region, such as eyebrows, eyes, nose, and mouth, from the plurality of captured face images, and models the face of the driver using the feature points. The face direction detection unit 22 detects the three-dimensional (3D) direction (position and posture) of the face of the corresponding driver using the generated face model.

Once the face direction has been set by the face direction detection unit 22, the pupil center position detection unit 24 detects the center positions of the pupils of the driver using estimated eye position values based on the feature points of eyes and the face direction. In other words, if the face direction detection unit 22 has set the face direction, the pupil center position detection unit 24 performs the operation of detecting the center positions of the pupils based on various types of information received from the face direction detection unit 22. Of course, depending on the circumstances, when the face direction detection unit 22 starts the operation of detecting the face direction, the pupil center position detection unit 24 may perform the operation of detecting the center positions of the pupils based on the information received from the capturing unit 20.

Accordingly, in FIG. 5, the face direction detection unit 22 and the pupil center position detection unit 24 are implemented as separate components, but they may also be collectively integrated into a single block and configured to detect a face direction and the center positions of pupils.

The viewing angle calculation unit 26 estimates the line-of-sight direction of the corresponding driver based on the face direction detected by the face direction detection unit 22 and the center positions of the pupils detected by the pupil center position detection unit 24, and then calculates a viewing angle. Preferably, the viewing angle calculation unit 26 estimates the coordinates of the center of a head and the coordinates of the centers of eyeballs based on face geometry and structure of a human being from the received face direction and the received center position of pupils. Further, the viewing angle calculation unit 26 estimates (detects) a line-of-sight direction using the estimated coordinates (that is, the coordinates of the center of the head and the coordinates of the center of the eyeballs) and the center positions of pupils. Further, the viewing angle calculation unit 26 calculates the viewing angle of the driver in consideration of the face direction and the line-of-sight direction of the driver.

The virtual object generation unit 28 generates virtual objects by means of image recognition using a camera sensor or by means of the recognition of guideboard information using 3D map information. In greater detail, the virtual object generation unit 28 can recognize moving objects, such as a pedestrian and a vehicle located in front of the driver's seat, using the camera sensor, and can recognize stationary objects, such as a guideboard, a road sign, and a building, using the 3D map information. Therefore, the virtual object generation unit 28 generates information about virtual objects that include stationary objects in front of the driver's seat based on the 3D map information and moving objects in front of the driver's seat based on image recognition. The information about the virtual objects includes position coordinates of the respective virtual objects.

The navigation unit 30 calculates and outputs the location value of the vehicle in real time.

The matching unit 32 matches the locations of real-world information located in front of the driver's seat with the locations of the corresponding virtual objects, located in front of the driver's seat and generated by the virtual object generation unit 28, based on the line-of-sight direction and the viewing angle output from the viewing angle calculation unit 26. That is, the matching unit 32 receives information about the virtual objects from the virtual object generation unit 28, and matches the coordinates of the real-world information with the coordinates of the virtual object information depending on the line-of-sight direction and the viewing angle output from the viewing angle calculation unit 26. Here, the real-world information denotes objects actually viewed through the windshield located in front of the driver's seat.

In more detail, the matching unit 32 calculates the head direction of the driver and the location value of the line of sight of the driver by mapping them to real-world coordinates in consideration of the relationship between the relative locations of the vehicle and the driver, based on the location value of the vehicle obtained by the navigation unit 30. The matching unit 32 can also calculate the initial values of the direction and the location of the display unit 10 by automatically mapping them to real-world coordinates, based on the location value of the vehicle. Meanwhile, the matching unit 32 performs matching by mapping the coordinates of the virtual object information in conformity with the range of the viewing angle of the driver and the coordinates of the mapping locations of the real world which have been automatically calculated in the above procedure, using a camera calibration and registration method.

The matching error calculation unit 34 calculates a matching error occurring in the matching procedure performed by the matching unit 32.

The adjustment unit 36 rotates the display unit 10 or changes the location of the display unit 10 based on the matching error calculated by the matching error calculation unit 34. The adjustment unit 36 rotates or changes the location of the display unit 10 until the matching error calculated by the matching error calculation unit 34 falls within a preset error range. Therefore, the matching unit 32 re-matches the locations of the real-world information with the locations of the virtual object information if adjustment has been conducted by the adjustment unit 36. In this way, the coordinates of the virtual objects precisely match the coordinates of the real-world information.

Figure 6:
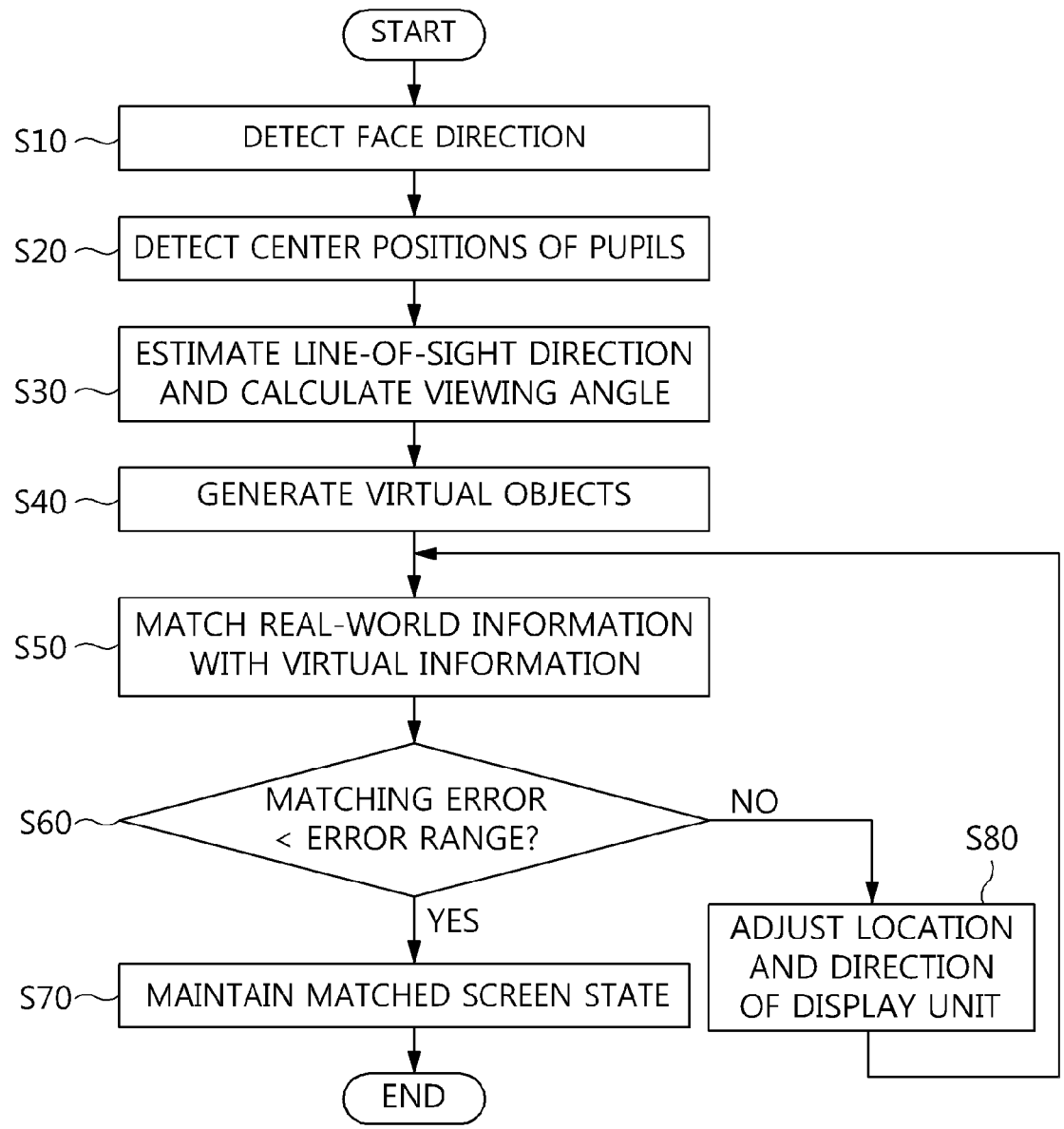
FIG. 6 is a flowchart showing an automotive augmented reality HUD method according to an embodiment of the present invention.
Figure 7:
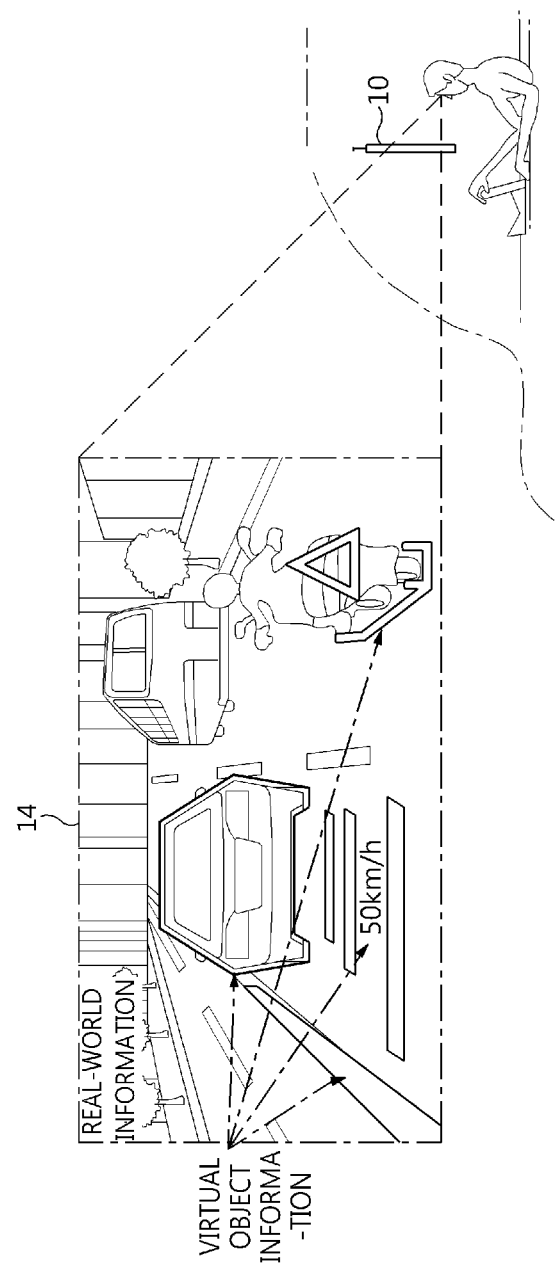
Figure 8:
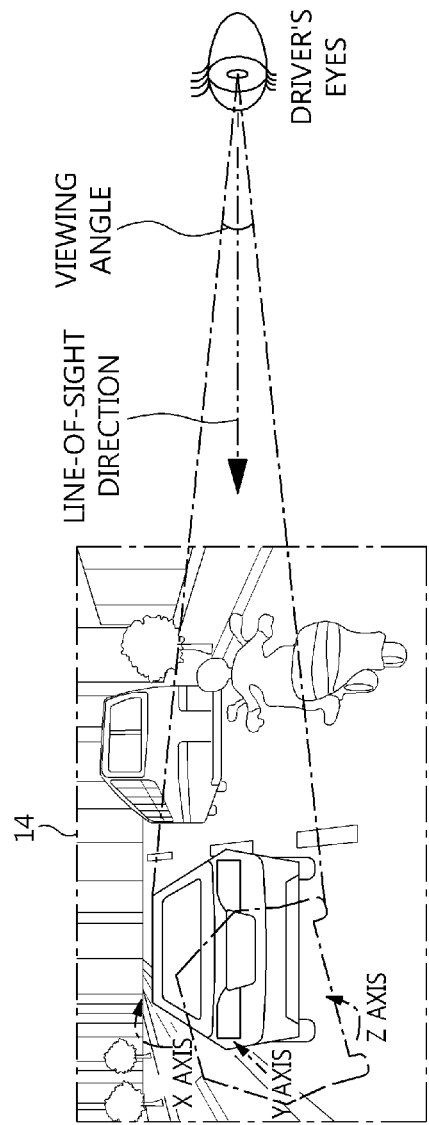

Below, an automotive augmented reality HUD method according to an embodiment of the present invention will be described in detail with reference to the flowchart shown in FIG. 6. FIGS. 7 to 9 are diagrams used to describe the automotive augmented reality HUD method according to an embodiment of the present invention.

First, the capturing unit 20 captures face images of a driver and outputs a plurality of captured face images.

Next, the face direction detection unit 22 detects the direction of the driver's face based on the plurality of face images captured by the capturing unit 20 at step S10.

Then, the pupil center position detection unit 24 detects the center positions of the pupils of the driver using the feature points of eyes and the estimated position values of the eyes based on the face direction, on the basis of the plurality of face images captured by the capturing unit 20 or the information detected by the face direction detection unit 22 at step S20.

Information corresponding to the face direction and the center positions of the pupils detected in this way is transmitted to the viewing angle calculation unit 26.

Accordingly, the viewing angle calculation unit 26 estimates the line-of-sight direction of the corresponding driver based on the detected face direction and the detected center positions of the pupils, and then calculates a viewing angle at step S30.

Thereafter, the virtual object generation unit 28 generates virtual objects by means of the recognition of images using a camera sensor or by means of the recognition of guideboard information using 3D map information at step S40.

Then, the matching unit 32 matches the locations of real-world information located in front of the driver's seat with the locations of the corresponding virtual object information, located in front of the driver's seat and generated by the virtual object generation unit 28, on the basis of the line-of-sight direction and the viewing angle output from the viewing angle calculation unit 26 at step S50.

In this way, when the matching by the matching unit 32 has been completed, the matching error calculation unit 34 calculates a matching error occurring in the matching unit 32. The adjustment unit 36 determines whether to rotate the display unit 10 and change the location of the display unit 10 depending on the calculated matching error, and then performs an operation corresponding to the results of the determination.

That is, if it is determined that the calculated matching error falls within a preset error range ("Yes" at step S60), the adjustment unit 36 determines that the rotation and the location change of the display unit 10 are not required. Accordingly, a screen 14 illustrated in FIG. 7 is displayed on the display unit 10 at step S70. Here, the screen 14 of FIG. 7 shows that the locations of the real-world information and the locations of the virtual object information are exactly matched and displayed in the range of the visual field of the driver.

In contrast, if it is determined that the calculated matching error falls out of the preset error range ("No" at step S60), matching between the locations of the real-world information and the locations of the virtual object information is not exactly performed, as illustrated in FIG. 8. Accordingly, the adjustment unit 36 rotates the display unit 10 or changes the location of the display unit 10, as illustrated in FIG. 9, until the matching error value falls within the preset error range, and the matching unit 32 re-matches the locations of the real-world information with the locations of the virtual object information depending on the adjustment performed by the adjustment unit 36 at step S80.

Here, the method of adjusting the direction and the location of the display unit 10 will be described again as follows.

First, a manual adjustment method will be described. A first manual adjustment method is configured such that the direction and the location of the display unit 10 are personally adjusted by the driver with his or her hand in conformity with the viewing angle and the line of sight of the driver. A second manual adjustment method is configured such that the driver adjusts the direction and the location of the display unit 10 using a motor (not shown) and a button (not shown) which can be used to move the display unit 10 at regular intervals along the directions and locations of respective x, y, and z axes. The motor and the button that are not shown in the drawing can be installed on the display unit 10, and can be sufficiently understood by those skilled in the art although they are not separately shown in the drawing.

Next, an automatic adjustment method will be described as follows. Such an automatic adjustment method is configured to automatically extract the viewing angle and the line-of-sight direction of the driver depending on the positions of the driver's eyes and the face direction of the driver based on a face model without the intervention of the driver, thus enabling the location and direction of the display unit 10 to be automatically adjusted in conformity with the extracted values.

According to the present invention having the above configuration, when guidance information related to the driver's safety and convenience is required, and the driver desires to receive such guidance information, an augmented reality display can be used, thus providing driver-centered information.

Further, the present invention is advantageous in that in order to adapt required guidance information to the visual field of the driver and to more precisely match the guidance information with the visual field and provide the matched information, the driver can personally adjust the angle or location of a display. Therefore, the present invention can adjust the rotation of the display around individual axes and the location change of the display in horizontal, vertical, and forward/backward directions.

The present invention enabling adaptive location/direction changes can reduce a location error between virtual object information provided to the driver on the HUD and real-world information. Accordingly, a load of the driver to recognize the provided information can be reduced, and a risk of accident caused by an error of determination can be reduced.

The present invention is also advantageous in that the convenience and the safety of the driver can be ensured in all driving environments including a night driving environment and a bad weather environment in which it is difficult to secure a visual field.

Further, the present invention can be implemented as computer-readable code in a computer-readable storage medium. The computer-readable storage medium includes all types of storage devices in which data readable by a computer system is stored. Examples of the computer-readable storage medium includes Read Only Memory (ROM), Random Access Memory (RAM), Compact Disc ROM (CD-ROM), magnetic tape, a floppy disc, an optical data storage device, etc., and also includes the form of carrier waves (for example, transmission over the Internet). Furthermore, the computer-readable storage medium can be distributed to computer systems connected over a network and computer-readable code can be stored and executed in a distributed manner.

Although the preferred embodiments of the present invention have been disclosed for illustrative purposes, those skilled in the art will appreciate that various modifications, additions and substitutions are possible, without departing from the scope and spirit of the invention. Therefore, the technical scope of the present invention should be defined by the technical spirit of the claims.

What is claimed is:

1. An automotive augmented reality Head-Up Display (HUD) apparatus, comprising:
    a viewing angle calculation unit for estimating a line-of-sight direction of a driver using a face direction, detected based on face images of the driver, and center positions of pupils of the driver and calculating a viewing angle;
    a matching unit for matching a location of real-world information located in front of a driver's seat with a location of corresponding virtual object information located in front of the driver's seat, based on the line-of-sight direction and the viewing angle output from the viewing angle calculation unit;
    a display unit for displaying results of the matching by the matching unit, wherein the display unit is configured to enable rotation thereof and location change thereof;
    a matching error calculation unit for calculating a matching error occurring in the matching unit; and
    an adjustment unit for rotating the display unit or changing the location of the display unit based on the matching error calculated by the matching error calculation unit,
    wherein the matching unit re-matches a location of the real-world information with a location of the virtual object information through the adjustment by the adjustment unit.

2. The automotive augmented reality HUD apparatus of claim 1, wherein the rotation of the display unit includes movements in directions of pitch, roll, and yaw.

3. The automotive augmented reality HUD apparatus of claim 1, wherein the location change of the display unit includes leftward, rightward, upward, downward, forward, and backward movements.

4. The automotive augmented reality HUD apparatus of claim 1, wherein the display unit is rotated or the location thereof is changed by a manual manipulation of the driver.

5. The automotive augmented reality HUD apparatus of claim 1, wherein the display unit is rotated or the location thereof is changed via automatic adjustment.

6. The automotive augmented reality HUD apparatus of claim 1, wherein the adjustment unit rotates the display unit or changes the location of the display unit until the calculated matching error falls within an error range.

7. The automotive augmented reality HUD apparatus of claim 1, wherein the display unit is operated at an initial location in a scroll type or a fold type to enter a displayable state.

8. The automotive augmented reality HUD apparatus of claim 7, wherein the display unit is manually scrolled up or down from the initial location or is manually unfolded from a folded state using a manual operation of the driver.

9. The automotive augmented reality HUD apparatus of claim 7, wherein the display unit is automatically scrolled up or down from the initial location or is automatically unfolded from a folded state in compliance with the driver's instruction.

10. The automotive augmented reality HUD apparatus of claim 1, wherein the virtual object information comprises one or more of a stationary object located in front of the driver's seat based on map information and a moving object located in front of the driver's seat based on recognition of images.

11. An automotive augmented reality Head-UP Display (HUD) method, comprising:
estimating, by a viewing angle calculation unit, a line-of-sight direction of a driver using a face direction, detected based on face images of the driver, and center positions of pupils of the driver and calculating a viewing angle;
matching, by a matching unit, a location of real-world information located in front of a driver's seat with a location of corresponding virtual object information located in front of the driver's seat, based on the line-of-sight direction and the viewing angle output at estimating the line-of-sight direction and at calculating the viewing angle;
displaying, by a display unit, results of the matching; and
performing, by an adjustment unit, one or more of rotation and location change of the display unit depending on the results of the matching;
wherein performing one or more of the rotation and the location change further comprises:
calculating a matching error occurring at matching; and
rotating the display unit or changing the location of the display unit based on the calculated matching error,
wherein matching is configured to re-match the location of the real-world information with the location of the virtual object information based on adjustment at performing one or more of the rotation and the location change.

12. The automotive augmented reality HUD method of claim 11, wherein the rotation at performing one or more of the rotation and the location change includes movements in directions of pitch, roll, and yaw.

13. The automotive augmented reality HUD method of claim 11, wherein the location change at performing one or more of the rotation and the location change includes leftward, rightward, upward, downward, forward, and backward movements.

14. The automotive augmented reality HUD method of claim 11, wherein performing one or more of the rotation and the location change is configured to rotate the display unit or change the location of the display unit until the calculated matching error falls within an error range.

15. The automotive augmented reality HUD method of claim 11, wherein displaying is performed after the display unit has been operated at an initial location in a scroll type or a fold type to enter a displayable state.

16. The automotive augmented reality HUD method of claim 15, wherein the display unit is manually scrolled up or down from the initial location or is manually unfolded from a folded state using a manual operation of the driver.

17. The automotive augmented reality HUD method of claim 15, wherein the display unit is automatically scrolled up or down from the initial location or is automatically unfolded from a folded state in compliance with the driver's instruction.

18. The automotive augmented reality HUD method of claim 11, wherein the virtual object information comprises one or more of a stationary object located in front of the driver's seat based on map information and a moving object located in front of the driver's seat based on recognition of images.

* * * * *